July 18, 1933.  F. J. BECHERT  1,918,955
CHUCK
Filed Oct. 27, 1930
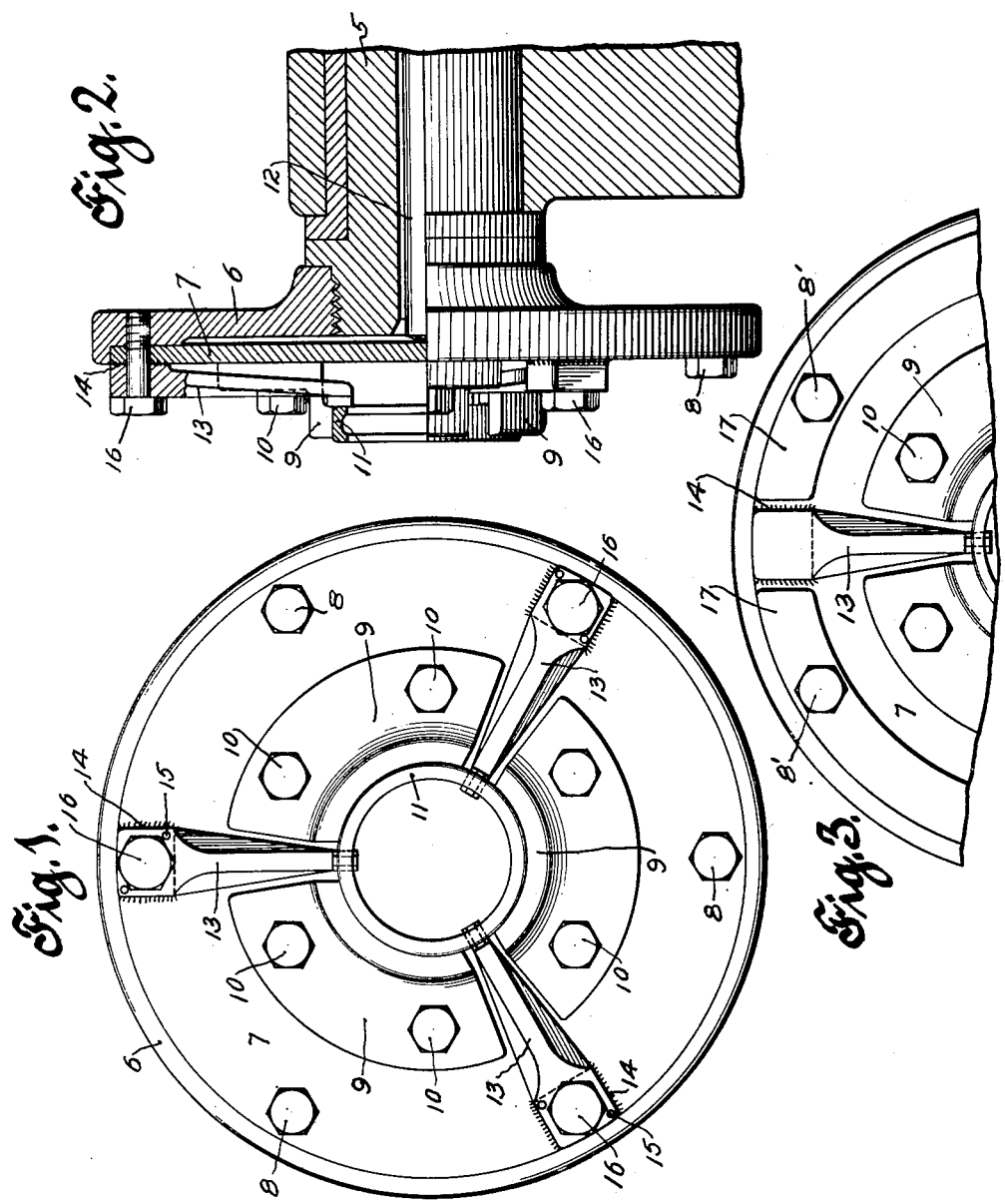
INVENTOR
Fred J. Bechert
BY
Mitchell Bechert
ATTORNEYS Patented July 18, 1933

1,918,955

UNITED STATES PATENT OFFICE

FRED J. BECHERT, OF STAMFORD, CONNECTICUT, ASSIGNOR TO THE FAFNIR BEARING COMPANY, OF NEW BRITAIN, CONNECTICUT, A CORPORATION OF CONNECTICUT

CHUCK

Application filed October 27, 1930. Serial No. 491,563.

My invention relates to a diaphragm chuck, and more particularly to certain improvements on a chuck of the type disclosed in Scaife Patent No. 1,389,272, dated August 30, 1921.

In said Scaife patent there are work stops carried by the diaphragm, but such work stops are so arranged that, upon flexing of the diaphragm to move the chuck jaws, the work stops also move. Thus, in gripping objects of different sizes, such objects being in contact with the work stops, will not always be in the same longitudinal position relatively to the body of the chuck.

In order to overcome the above noted objection to the work stop arrangement of the Scaife Patent, it has heretofore been proposed to secure work stops to the chuck body and have the same project freely through apertures in the diaphragm, so that the work stops will be independent of the diaphragm. While such an arrangement will ordinarily serve to definitely locate a work piece relatively to the chuck body, there are some disadvantages of such a construction. For example, when a different diaphragm and chuck jaws are secured to the body of such a chuck new work stops will usually have to be provided and adjusted. With the work stops carried on the diaphragm and adapted to the particular jaws of that diaphragm, such diaphragm may be freely substituted for another similar one on a chuck body and the work stops are at once available without adjustment or change.

It is the general object of my invention, therefore, to provide a chuck of the character indicated with work stops carried by the diaphragm and arranged so as to always locate work pieces in a definite longitudinal position. Other objects and features of invention will hereinafter appear.

In the drawing which shows, for illustrative purposes only, preferred forms of the invention—

Fig. 1 is a front view in elevation of a chuck illustrating features of the invention;

Fig. 2 is a side view in quarter section of the chuck shown in Fig. 1;

Fig. 3 is a fragmentary front elevation of a slight modification.

In said drawing, 5 indicates a spindle or other support for the face plate portion 6, which alone or in connection with the spindle constitutes what may be termed the body of the chuck. A diaphragm 7 is secured to the chuck body, preferably at the periphery of the diaphragm. In the form shown in Figs. 1 and 2 a series of cap screws 8—8 extend through the diaphragm and are threaded into the face plate 6. The diaphragm carries chuck jaws 9—9 which, as shown, may be separate members attached to the diaphragm, as by cap screws 10—10. The jaws herein disclosed are shaped for gripping a ball bearing ring 11.

For the particular chuck arrangement shown the diaphragm is arranged to be flexed by a push rod 12, to be actuated in any suitable manner. It will be seen that, upon movement of the push rod 12 to the left in Fig. 2, the diaphragm will be flexed and the chuck jaws moved radially outwardly. Thereafter, upon moving the push rod 12 toward the right, the diaphragm will spring back, and in so doing cause the jaws 9—9 to grip the work piece, such as the bearing ring 11, all as is set forth in the Scaife patent above referred to.

In order to definitely locate the work piece 11 longitudinally I provide work stop means carried by the diaphragm and extending into proper position to act as locating stops for such work piece. My work stops in the form shown are bars or fingers 13—13, secured at their base portions to the diaphragm substantially at its periphery or, more properly, substantially at the portion thereof which is secured to the chuck body. At such location the flexing movement of the diaphragm is a minimum. That portion of each work stop beyond the base portion extends transversely of the diaphragm and out of contact therewith. The work stops 13—13 may be secured to the diaphragm as by welding, as indicated at 14 and/or by dowels or screws 15. Cap screws or the like 16 may secure the work stops to the diaphragm and, in addition, assist in securing the diaphragm to the chuck body. It will thus be seen that, with the work stops carried by the diaphragm and secured directly thereto substantially at the part thereof where it is secured to the chuck body, the work stops 13—13 will be moved to the minimum extent or not at all by the flexing of the diaphragm.

By means of my arrangement work stops appropriate to the particular diaphragm and chuck jaws carried thereby are all carried directly by the diaphragm, so that, in case it is desired to substitute a different diaphragm and chuck jaws for one on the chuck body, the appropriate work stops will be present and adjusted. This advantage cannot be attained where the work stops are independent of the diaphragm, as when they are secured directly to the chuck body and project through apertures in the diaphragm.

In Fig. 3 the arrangement is substantially the same as in the preceding views, except that I provide securing rings 17—17 peripherally of the diaphragm and cause the cap screws or other securing means 8' to extend through said rings 17 and diaphragm, thus securely holding the diaphragm in place. The work stop 13 shown in Fig. 3 is indicated at 14 as being merely welded to the diaphragm.

It will thus be seen that I have provided an exceedingly simple arrangement having the advantages over other similar chucks as hereinabove indicated.

While preferred forms of the invention have been described in detail, it is to be understood that various changes and modifications may be made within the scope of the invention as defined in the appended claims.

I claim:

1. In a device of the character indicated, a chuck body, a diaphragm, chuck jaws on said diaphragm, means for flexing said diaphragm to move said chuck jaws, a work stop, and a common means for rigidly holding said work stop and said diaphragm on said chuck body.

2. In a device of the character indicated, a chuck body, a diaphragm secured thereto, chuck jaws on said diaphragm, means for flexing said diaphragm for moving said jaws, and a work stop member secured to said diaphragm said work stop member having a part extending along said diaphragm and out of contact therewith to a point where it will be engaged by a work piece held by said jaws.

3. In a device of the character indicated, a chuck body, a diaphragm secured thereto, chuck jaws on said diaphragm, means for flexing said diaphragm to move said chuck jaws, and a work stop secured to said diaphragm and extending transversely of said diaphragm and out of contact therewith from one side of one of said jaws to the other side thereof.

4. In a device of the character indicated, a chuck body, a diaphragm secured at its periphery to said chuck body, chuck jaws on said diaphragm radially inwardly from its periphery, means for flexing said diaphragm for moving said jaws radially, and a work stop comprising a member having a base portion secured to said diaphragm at the periphery of the latter, said work stop having a portion extending from said base portion and out of contact with and along said diaphragm to a point where it will be engaged by a work piece held by said jaws.

5. In a device of the character indicated, a diaphragm having a relatively immovable portion and a relatively movable portion, chuck jaws on the relatively movable portion of said diaphragm, means for moving the relatively movable portion of said diaphragm to move said jaws, and immovable work stop means rigidly mounted upon the immovable portion of said diaphragm and extending laterally of the supporting point to a point to one side thereof for engaging and locating a work piece to be held by said jaws.

6. In a device of the character indicated, a chuck body, a diaphragm secured thereto and having chuck jaws thereon, means for flexing a portion only of said diaphragm to move said chuck jaws, and immovable work stop means immovably secured to said body beyond the flexing portion of said diaphragm and having a part extending laterally of the supporting point to a point to be engaged by a work piece to be held by said jaws.

FRED J. BECHERT.